United States Patent [19]

Winter

[11] Patent Number: 4,516,985
[45] Date of Patent: May 14, 1985

[54] METHOD FOR THE ABSORPTIVE PURIFICATION OF A GAS STREAM OF VAPOROUS OR GASEOUS IMPURITIES

[75] Inventor: Karl Winter, Dortmund, Fed. Rep. of Germany

[73] Assignee: Rekuperator KG Dr.-Ing. Schack & Co., Düsseldorf, Fed. Rep. of Germany

[21] Appl. No.: 526,555

[22] Filed: Aug. 25, 1983

[30] Foreign Application Priority Data

Aug. 28, 1982 [DE] Fed. Rep. of Germany ....... 3232134
Jun. 9, 1983 [DE] Fed. Rep. of Germany ....... 3320735

[51] Int. Cl.³ .............................................. B01D 53/04
[52] U.S. Cl. ......................................... 55/18; 55/25; 55/59; 55/74
[58] Field of Search ................... 55/20, 21, 25, 26, 59, 55/61, 62, 74, 160–163, 179, 180, 198, 208, 387, 18

[56] References Cited

U.S. PATENT DOCUMENTS

| | | | |
|---|---|---|---|
| 1,402,340 | 1/1922 | Burrell et al. | 55/180 |
| 2,080,578 | 5/1937 | Ray | 55/179 |
| 2,114,810 | 4/1938 | Ray | 55/179 X |
| 2,413,771 | 1/1947 | Luaces | 55/179 |
| 2,428,885 | 10/1947 | Luaces | 55/179 X |
| 3,534,529 | 10/1970 | Mattia | 55/62 |
| 3,596,438 | 8/1971 | Beukenkamp et al. | 55/59 |
| 4,021,211 | 5/1977 | Turek et al. | 55/59 X |
| 4,039,306 | 8/1977 | Taylor | 55/179 X |
| 4,203,734 | 5/1980 | Winter et al. | 55/62 X |
| 4,282,015 | 8/1981 | Bartoschek et al. | 55/179 |
| 4,336,159 | 6/1982 | Winter | 55/62 X |
| 4,409,006 | 10/1983 | Mattia | 55/62 X |

FOREIGN PATENT DOCUMENTS

| | | | |
|---|---|---|---|
| 2703737 | 8/1978 | Fed. Rep. of Germany | 55/59 |
| 2936873 | 9/1979 | Fed. Rep. of Germany | . |
| 2952127 | 12/1979 | Fed. Rep. of Germany | . |
| 366885 | 2/1932 | United Kingdom | 55/59 |

*Primary Examiner*—Robert Spitzer
*Attorney, Agent, or Firm*—Herbert L. Lerner; Laurence A. Greenberg

[57] ABSTRACT

Method for operating a sorption filter in which the sorption filter separates absorbable admixtures of a gas stream and is regenerated by a heated gaseous desorption medium after being loaded to an equilibrium loading corresponding to the admixtures. The gas stream to be purified is conducted through at least two sorption material layers, with the flow going through all sorption material layers in the manner of a parallel circuit. In the desorption of the loaded sorption material layers, the gaseous desorption medium flows in series through the sorption material layers.

6 Claims, 2 Drawing Figures

METHOD FOR THE ABSORPTIVE PURIFICATION OF A GAS STREAM OF VAPOROUS OR GASEOUS IMPURITIES

BACKGROUND OF THE INVENTION

1. Field of the Invention

The invention relates to the adsorptive purification of the gas stream of vaporous or gaseous impurities in a sorption filter, where at least two layers of sorption material are present in the sorption filter.

2. Description of the Prior Art

Activated carbon is frequently used for the separation of vaporous or gaseous impurities from a gas stream, for instance, exhaust air. In order to recover the separated substances and to make the activated carbon adsorptive again, a regeneration by means of a heated gas is performed. As is known from German patent application No. 29 52 127 and from German patent application No. 29 36 873, a gaseous desorption medium is heated for the regeneration, the heated medium is driven through the sorption material layers, and the desorption medium loaded with desorbate is cooled after it has flowed through the sorption material layers to condense desorbate, at least in part, and the liquified desorbate component discharged. In order to avoid losses of desorption medium and recoverable desorbate, the desorption medium with the uncondensed desorbate residues is frequently returned to the heating location, is heated there and pushed again through the sorption material layers. Since the partial pressure of the desorbate can be lowered only to the equilibrium with the vapor saturation concentration corresponding to the cooling temperature reached, the desorption cannot be complete because of the partial residual pressure of the desorbate; therefore the sorption material retains its residual loading. Particularly high residual loadings remain, according to experience, if relatively thin layers of activated carbon (0.5 m and less) are employed. Thicker layers however lead to greater pressure losses and thereby to increased energy consumption.

It has now been found that this residual loading can still be too high if the desorption temperatures are relatively low and the condensation temperatures relatively high. This is often the case for economy and operating reasons because, as a rule, only steam with temperatures slightly above 100° C. is available for the heating for desorption, and for the cooling for condensation, only cooling water of 10° to 20° C. is available. This low temperature difference between the desorption and the condensation temperature of 80° to 90° K. leads to reloading of the desorbed sorption material because of the high residual partial pressure, especially in the case of such driven-out admixtures (desorbate) with a low boiling point. The residual partial pressure is predetermined here by the condensation temperature and the absorptivity of the sorption material is influenced by the desorption temperature. The reloading of the desorbed sorption material results in a shortened service life (time between two desorptions) and leads in particular to a high concentration of the substances to be separated in the purified gas, at the beginning of the sorption phase.

In order to lower the vapor pressure of the desorbate in the desorption medium during the desorption, U.S. Pat. No. 3,534,529 proposes to provide a secondary adsorption filter instead of the condensation in the desorption loop. As a result, the partial pressure of the desorbate in the desorption medium practically disappears at least in the starting phase of the desorption. In order to maintain the low partial pressure over the entire desorption cycle, a design of the secondary adsorber is required which is uneconomical as measured by the design of the adsorption filters. The secondary adsorber must be capable of taking up the entire mass of desorbate stored in the adsorption filter without a breakthrough, especially since the temperature of the desorption medium increases toward the end of the desorption and because more cooling is required in order to obtain the high loading of the secondary adsorber. In spite of the high loadability of the sorption material of the secondary adsorber due to the high partial pressure prevailing during the desorption, this secondary adsorber cannot be designed substantially smaller than the sorption filter itself.

SUMMARY OF THE INVENTION

An object of the invention is to provide a method for the adsorptive purification of a gas stream in a sorption filter and the regeneration of the adsorption filter which avoids these disadvantages and makes possible economical and reliable operation.

With the foregoing and other objects in view, there is provided in accordance with the invention a method for the adsorptive purification of a gas stream of vaporous or gaseous impurities in a sorption filter and the regeneration of the sorption filter which comprises dividing the gas stream to be purified into at least two smaller streams, passing the smaller streams of gas into a sorption filter containing a plurality of spaced sorption material layers, distributing the small streams of gas to enter different individual sorption layers to obtain, as in parallel flow, a reduced volume flow of gas through at least some of the layers, as compared to the total volume flow of the gas to be purified, as in series flow, discharging purified gas from the sorption filter, and terminating the adsorptive purification of the gas stream when the sorption filter becomes loaded with the impurities; regenerating the loaded sorption filter to restore the absorptivity of the sorption material layers by passing a heated gaseous desorption medium in series flow through the sorption material layers to remove the impurities from the layers.

Other features which are considered as characteristic for the invention are set forth in the appended claims.

Although the invention is illustrated and described herein as embodied in a method for the adsorptive purification of a gas stream of vaporous or gaseous impurities, it is nevertheless not intended to be limited to the details shown, since various modifications may be made therein without departing from the spirit of the invention and within the scope and range of the equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
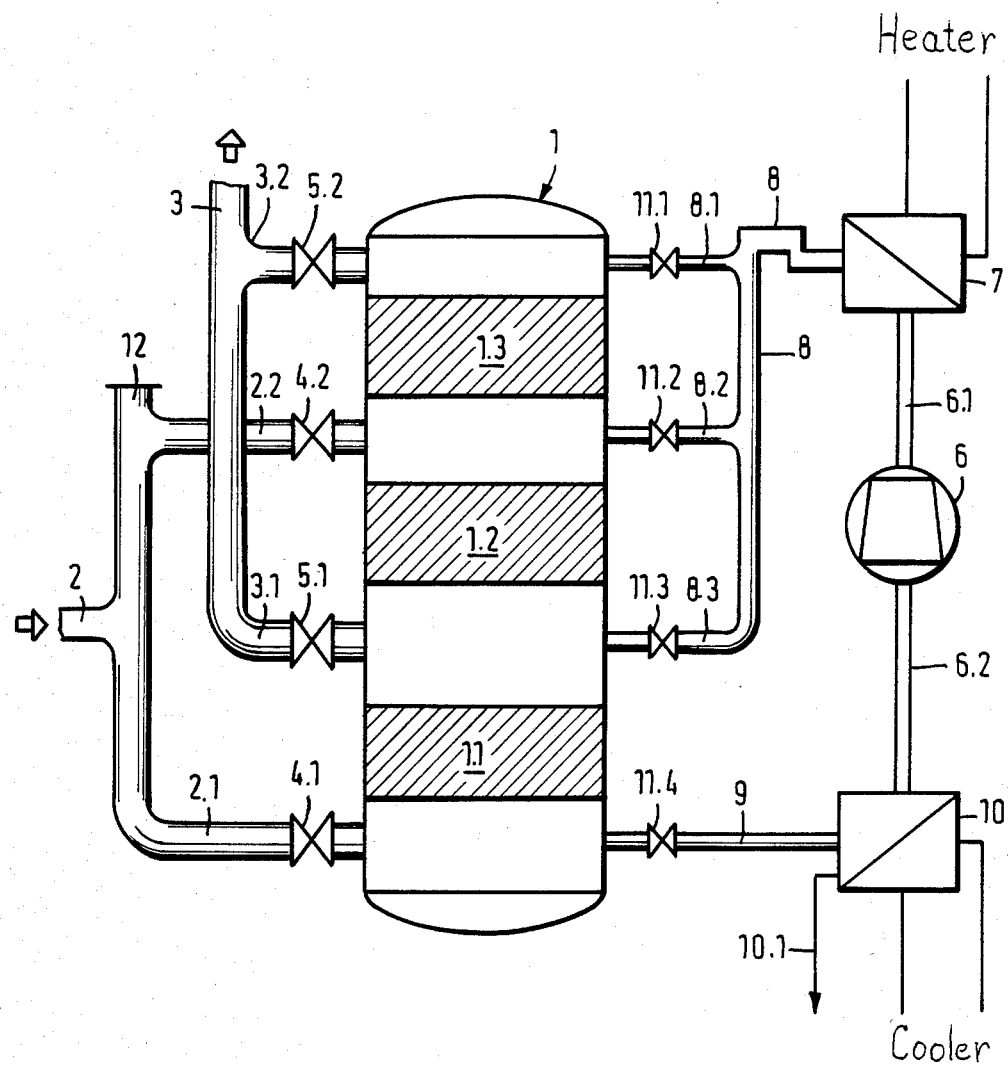
FIG. 1 diagrammatically illustrates apparatus for carrying out the method according to the invention. The raw gas stream to be purified is separated into two streams, each of lower volumetric flow. The two streams are directed into the sorption filter having three sorption material layers with spaces between the layers. One stream of gas is fed beneath the lowest layer and the other stream is fed in the space beneath an upper layer. This parallel flow arrangement of streams of gas through the layers results in a reduced pressure drop in the sorption filter. In regeneration of the sorption filter, a gaseous desorption medium is recirculated, passing in series through the layers in the sorption filter. A blower, heater and cooler are provided in the circuit. Piping is also provided for bypassing individual layers.

According to the invention, the gas stream to be purified is conducted through at least two sorption material layers, where all sorption material layers are traversed in the manner of a parallel circuit, and where the gaseous desorption medium flows as in a series connection through the sorption material layers for the desorption of the loaded sorption medium layers. In addition, a gas preferably with high nitrogen content is used as the gaseous desorption medium which gas is essentially inert with respect to the sorption material and the separated admixtures (desorbate). The arrangement and flow pattern of the sorption medium layers in the operating state "purification of the gas stream" relates to a parallel connection of the sorption material beds. The relatively large volumetric flow of the gas to be purified is therefore distributed to the individual sorption material beds and flows through the latter at low speed. This low speed of the gas has a low pressure difference (pressure drop) for relatively large sorption medium layer thicknesses. Thus, with small pressure differences, the purification of the gas can be operated with low energy consumption. In the operating state "regeneration" the connection of the sorption material layers corresponds to a series connection. Here, a relatively small gas stream as the desorption medium is pushed through the series-connected sorption material layers. Here also, the product of volumetric flow and pressure difference is small.

In a preferred form of the method during the desorption of the loaded sorption material layers, an additional sorption material layer follows the loaded sorption material layers in the flow direction of the gaseous desorption medium. Thus, in this method of operation, the sorption system is increased by one layer. This latter layer does not participate in the purification of the gas stream itself, but is subjected exclusively to the desorption as the last layer in the regenerating phase. Since a remaining residual loading remains in this layer, which of course is not employed again in the adsorption phase for the purification of the gas stream, this residual loading is of no consequence with respect to the initial purified gas concentration which adjusts itself.

It is of advantage that the gaseous desorption medium used here preferably be a nitrogen-containing gas which is essentially inert to the sorption material and the separated admixtures. The use of such a desorption medium reduces the danger of undesirable chemical reactions, especially the danger of fire.

In a further embodiment of the method, the heated gaseous desorption medium during the desorption first flows through all sorption material layers and, with the sorption advancing in time, initially the first sorption material layer is bypassed, then the following sorption material layer is bypassed, and finally further ones are bypassed by the desorption medium flow until the last sorption material layer is reached. The elimination of one of the sorption material layers from the desorption medium stream may be triggered by the temperature rise of the desorption medium behind this sorption material layer. As an alternative to this, switching off one of the sorption material layers from the desorption medium stream may be triggered by the decline of the concentration of the driven-out desorbate.

A further reduction of the energy consumption is achieved since the pressure difference which the desorption medium stream overcome decreases with advancing desorption and the reduction, connected therewith, of the number of layers to be desorbed. After the first sorption material layer is heated through and through and the sorbate stored therein is transferred as desorbate to the following layers, the hot desorption medium is also bypassed around this layer and this continues with bypassing the succeeding layer and so forth until all sorption material layers are heated up and desorbed. The switching-off of the respective layer can be caused by the temperature rise behind the layer, which temperature is measured with a temperature sensor, as well as by the decrease of the desorbate concentration on the outflow side of the respective layer, which is determined, for instance, by means of an IR spectrometer. Empirical timing programs are also applicable, of course.

The gaseous desorption medium may be recirculated at the start without cooling until the break-through of the last sorption material layer occurs and desorbate is accumulated in condensable concentration. This avoids the use of the energy consuming cooling of the condenser in the initial phase of the desorption, in which the desorbate has not yet accumulated in condensable concentration. Only when the loading of the last layer in conjunction with the rising temperature makes desorbate leave in such concentrations that the saturation concentration corresponding to the condenser temperature is exceeded, is the condenser switched on and the desorbate condensed out. Through this procedure, not only is there a saving of the energy required for cooling the initial phase; in addition, the return of the thermal energy removed by the cooling becomes unnecessary in this initial phase.

The desorption medium, after the sorption material layers are desorbed and the desorbate condensed, is further circulated as a coolant until the temperature of the sorption material layers is sufficiently low and still remaining residual loading of the last sorption material layer is distributed at least partially over the other layers. This ensures that any remaining residual loading of the last sorption medium layer which is still heated through and through by the desorption, is taken up by the desorption medium carried as the coolant in the loop and is transferred to the previously arranged already cooled-off sorption medium layers. In this connection it is advisable to proceed analogously to the desorption and, starting from the sorption material layer first subjected to the flow, to remove the successive layers successively from the coolant stream and to bypass them, for instance, in accordance with a timing program or after progressive cooling in accordance with the tempreature measured between the layers.

With the aid of the gaseous desorption medium circulated as the coolant, the sorption medium layers used for separating the sorptionable admixtures from the gas stream to be purified as well as the additional desorption medium layer which follows these layers during the desorption in the flow direction of the gaseous desorption medium may be cooled independently of each other, such that the cooling medium always flows only through one group of sorption medium layers or through the additional sorption medium layer. In this embodiment of the method according to the invention, the cooling phase following the desorption is carried out in two stages. The gaseous desorption medium which is cooled here and used as the cooling medium is first conducted only through the additional sorption medium layer which is cooled thereby, and then exclusively via the other sorption medium layers which serve for the purification of the gas and then are cooled in turn, or vice versa. Thereby high residual loading of the additional sorption medium layer due to the incompleteness of the desorption is not transferred to the sorption medium layers employed for gas purification, but remains in the additional sorption medium layer which, of course, does not come into contact with the gas stream to be purified. Thereby, the usual influence of the remaining residual loading on the initial concentration of the impurities in the purified gas stream to be separated is suppressed.

Figure 2:
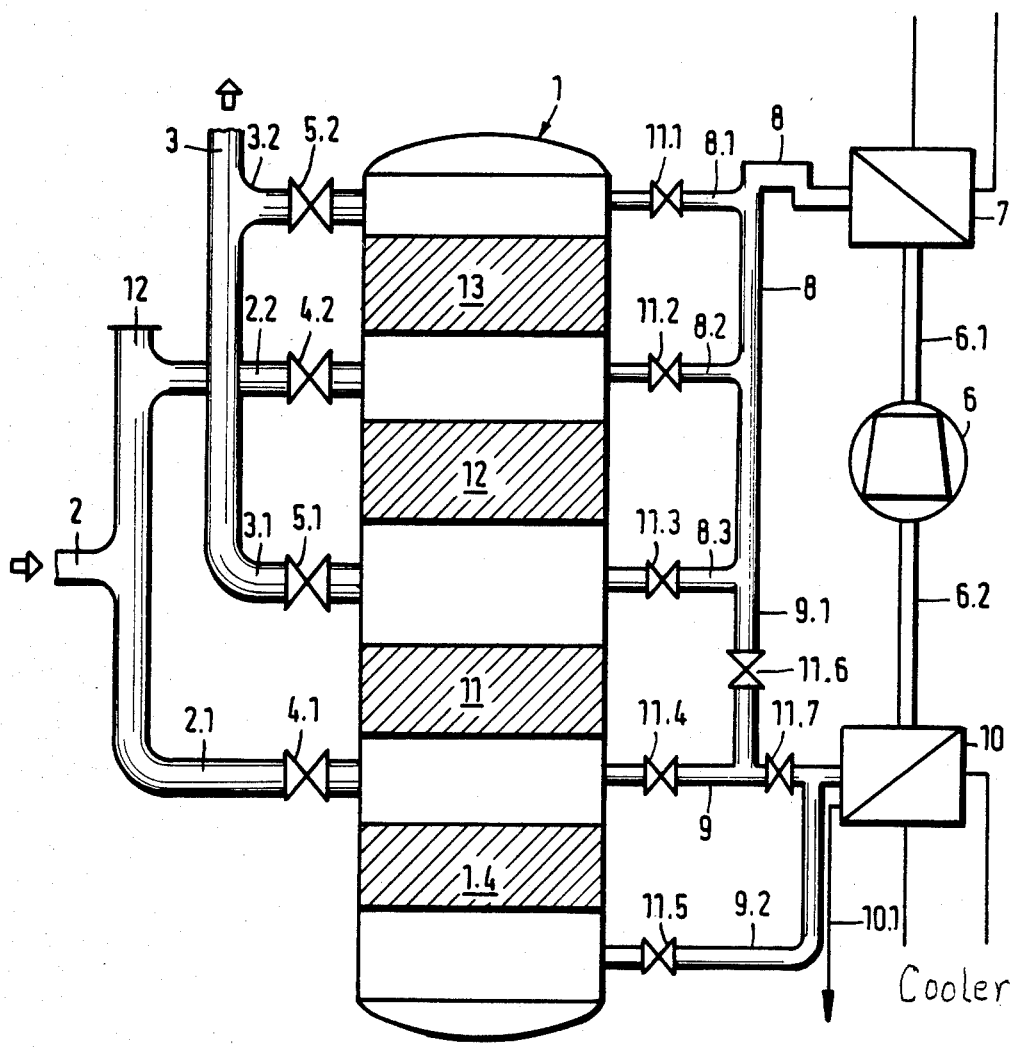
FIG. 2 illustrates a modification of FIG. 1, in that an additional sorption medium layer is provided for passage of the desorption medium but not for purification of the raw gas.

FIGS. 1 and 2 show process diagrams in accordance with the invention. The method of FIG. 1 differs particularly from the method of FIG. 2 in that the latter has an additional sorption medium layer through which the desorption medium passes but through which the raw gas for purification does not pass.

The process cycle according to the process diagram of FIG. 1 is as follows: After the raw gas to be purified flowing into the gas inlet spaces via the raw gas line 2, line 2.1, valve 4.1, line 2.2 and valve 4.2 has passed through the desorption material layers 1.1, 1.2 and 1.3 and has given up the vaporous or gaseous impuritites contained therein to the sorption material, the purified gas accumulating in the gas plenums leaves the sorption filter 1 through the connecting lines 3.1 and 3.2 and the purified gas discharge line 3. The sliding valves 4.1 and 4.2 on the raw gas side as well as the sliding valves 5.1 and 5.2 on the purified gas side are open while the valves 11.1, 11.2, 11.3 and 11.4 of the desorption loop are closed. After a certain time the sorption material is loaded with the impurities to be separated, i.e. the concentration of impurities in the purified gas exceeds a predetermined value. At this point in time the sorption filter 1 is switched from "purification of a gas" to "regeneration". The purification of the gas is now taken over, for instance, by another sorption filter, not shown by closing valves 4.1 and 4.2 and directing the raw gas through line 12 to the other sorption filter.

An inert gas, preferably nitrogen or a gas with a high nitrogen contact is employed for regeneration, first replacing any air in the adsorber and in the desorption loop. The regeneration operation is initiated by desorbing the loaded sorption material of the sorption material layers 1.1, 1.2 and 1.3. To this end, the loop blower 6 is set in operation forcing the gaseous desorption medium through blower discharge line 6.1, the heat heat exchanger 7, the feed line 8, line 8.1 and open valve 11.1 into sorption medium filter 1. The gaseous desorption medium passes through the sorption material layer 1.3, 1.2 and 1.1 and flows, with the valve 11.4 open, back to the circulating blower 6 via the line 9, the gas cooler 10 and the suction line 6.2. The heating of the heat exchanger 7 and the cooling of the gas cooler 10 are also set in operation. The desorption medium which enters the sorption material layer 1.3 in hot condition heats the latter and drives out the desorbate. The desorption medium is cooled down by this heating of layer 1.3 as well as by the desorption energy to be supplied, and leaves the first layer 1.3 at first with a relatively low temperature, but with a high desorbate concentration which is higher than that of the gaseous or vaporous impuritites in the air stream to be purified. Due to this high concentration of impurities in the desorption medium leaving layer 1.3, it is possible to force on the following, still cold layer 1.2 a substantially higher equilibrium loading with sorbate. The desorption medium, when leaving this layer 1.2, has an adsorbate concentration which is in the order of magnitude of the concentration which prevails in the gas stream to be purified. It is therefore far below the vapor saturation concentration; no condensation takes place in this phase in the gas cooler 10.

If, after a certain time (periods of 30 to 60 minutes can be assumed from a two-layer pilot plant), the first bed 1.3 is heated all the way through and with respect to desorption the concentration of the desorbate in the desorption medium has increased. Now the valve 11.1 is closed and the valve 11.2 opened causing the hot gaseous desorption medium to now flow through line 8.2 into the space between the sorption material layer 1.3 which was desorbed first and the following layer 1.2. The desorption of the layer 1.2 proceeds in a manner similar to the desorption of the preceding layer 1.3. First, because of the very high concentration of the desorbate, the following still cold sorption material layer 1.1 is loaded up to the corresponding equilibrium concentration. Only with advancing heating is the desorbate transferred to the sorption material layer which is the last one in the flow diagram. This last sorption material layer 1.1 is still cold at this point in time; it can be loaded further up to the equilibrium concentration which corresponds to the desorbate concentration in the desorption medium. In general, the breakthrough is reached quickly, and the condensation of the desorbate in the gas cooler 10 begins. The liquified desorbate leaves the gas cooler 10 via the drain 10.1. The desorption of the last gas purification sorption material layer 1.1 takes place after the breakthrough but the desorption of layer 1.1 is not to the same extend as the desorption of the previous layers, since the concentration of the desorbate in the returned desorption medium is much higher, and corresponds to the vapor saturation concentration according to the temperature reached in the gas cooler 10. After the desorption is completed, as indicated by the disappearance of condensate, the heating of the heat exchanger 7 is switched off and thus no further heat is supplied to the gaseous desorption medium. The gas which is conducted in the loop and is now cold because the cooling of the desorbate condenser 10 is switched on, is conducted via the open valve 11.1 with the valves 11.2 in line 8.2 and 11.3 in line 8.3 closed, through all sorption material layers, in the course of which the sorption material layers are cooled. The desorbate still stored in the sorption material layer which was desorbed last is relocated during the cooling so that, at the end of the cooling, the residual loading is present, distributed approximately uniformly over the sorption material layers. This completes the regeneration of the sorption filter 1; it can be switched back into the operating state "purification of the gas stream" after the valves 11.1, 11.2, 11.3 and 11.4 are closed and the sliding valves 4.1 and 4.2 on the raw gas side as well as the sliding valves 5.1 and 5.2 on the purified gas side are opened.

In order to further reduce the residual loading which is unavoidable and is high particularly in the case of impurities with a low boiling point, the procedure for cooling is modified according to the process diagram as shown in FIG. 2 after the heating of the heat exchanger 7 which heats the gaseous desorption medium is terminated. The circulation of the gaseous desorption medium through the blower 6 and cooling in the desorbate condenser 10 is continued. Thereby, the additional sorption material layer 1.4 is cooled down first, while the valves 11.1, 11.2, 11.3 and 11.7 are closed and the valves 11.6, 11.4, and 11.5 are open. This causes cooling of the additional sorption material layer 1.4 because the cooled gaseous desorption medium flows through the line 8, line 9.1 on to the line 9. After it has passed through the sorption material layer 1.4, the desorption medium flows off through the line 9.2. When this additional sorption material layer 1.4 has cooled down, the valves 11.6 and 11.5 are closed, the valve 11.7 is opened and the gaseous desorption medium is fed through the now opened valve 11.1 passing through all three sorption material layers 13, 12 and 11 and discharging through line 9 and valve 11.4. This arrangement can be maintained until all three layers have cooled down. However, in analogy to the desorption, the valve 11.2 may be opened and the valve 11.1 closed after the sorption material layer 13 has cooled down. Thereby, the pressure drop, against which the loop blower 6 must operate, is reduced. After the sorption material layer 12 is cooled down, a similar procedure can be applied to the succeeding sorption material layer until all sorption material layers have cooled down. It goes without saying that one can proceed in the reverse order with the same results, i.e., the sorption material layers serving for the purification of the gas are cooled first and subsequently and independently thereof, the additional sorption material layer; the sequence is immaterial. The sorption material layers and the additional sorption material layer never are together in the loop of the gaseous desorption medium during the cooling phase.

The embodiment of the idea of the invention, of course, does not remain limited to the embodiment examples shown. Thus, for instance, the individual sorption material layer can be accommodated in separate respective containers, which is certainly of advantage in large plants. Through special connections only one additional sorption material layer need be present for several sorption systems if it directly precedes the condenser heat exchanger.

The foregoing is a description corresponding, in substance, to German application Nos. P 32 32 134.1 dated Aug. 28, 1982 and P 33 20 735.6 dated June 9, 1983, international priority of which is being claimed for the instant application, and which is hereby made part of this application. Any material discrepancies between the foregoing specification and the specification of the aforementioned corresponding German application are to be resolved in favor of the latter.

I claim:

1. Method for operating a multi-layer sorption filter with a plurality of sorption material layers in which the number of layers is designated n, wherein n is an integer and has a value of at least 4, for purification of a gas stream containing gaseous or vaporous impurities, desorption of the sorption material layers loaded with the adsorbed impurities and cooling of the sorption material layers after their desorption, which comprises;

purifying a gas stream containing said impurities by dividing said gas stream in $(n-1)$ smaller gas streams, passing these smaller gas streams through $(n-1)$ of said n layers in parallel flow, with the $n^{th}$ sorption material layer remaining outside the flow of the gas streams being purified, and discharging purified gas from the sorption filter;

desorption of all n sorption material layers by feeding heated gaseous desorption medium through said layers, wherein the $n^{th}$ of said layers is the last layer the direction of the flow of the desorption gas through which all the desorption gas is circulated in a closed loop, in which the gaseous desorption medium containing desorbate from the sorption filter is cooled to condense the desorbate, reheated, and recirculated to the sorption filter, and discharging the condensed desorbate; cooling the group of $(n-1)$ sorption material layers independently of the cooling of the $n^{th}$ sorption material layer by feeding cooled desorption gas through either one of the group of $(n-1)$ sorption material layers and the $n^{th}$ sorption material layer and changing the feeding to the other after the first has become cold.

2. Method according to claim 1, wherein the gaseous desorption medium is a gas which is substantially inert to the sorption material and to the separated impurities.

3. Method according to claim 1, wherein during the desorption, the hot gaseous desorption medium first flows through all n layers and with advancing time of desorption, initially the first sorption material layer contacted by the hot gaseous desorption medium, and then the following layer and the succeeding layers are bypassed by the desorption medium stream until the last sorption material layer, the $n^{th}$ layer, is reached.

4. Method according to claim 3, wherein the layers are by-passed in steps sequentially with the layer to be by-passed being the first layer contacted by the heated desorption gas and thereafter each succeeding layer, and wherein by-passing of a sorption material layer from the desorption medium flow is triggered by a temperature rise behind the sorption material layer to be by-passed.

5. Method according to claim 1, wherein the layers are by-passed in steps sequentially with the layer to be by-passed being the first layer contacted by the heated desorption gas and thereafter each succeeding layer, and wherein by-passing of a sorption material layer from the desorption medium flow is triggered by a decrease of desorbate-concentration behind the sorption material layer to be by-passed.

6. Method according to claim 1, wherein the gaseous desorption medium is first returned without cooling by a circulation blower until the breakthrough of the last sorption material layer occurs and desorbate with a condensable concentration is produced, after which cooling of the gaseous desorption medium to condense the desorbate starts.

* * * * *